United States Patent [19]
Topf

[11] Patent Number: 5,169,650
[45] Date of Patent: Dec. 8, 1992

[54] CALIBRATION UNIT FOR EXTRUDED PLASTIC MATERIAL

[75] Inventor: Siegfried Topf, Traun, Fed. Rep. of Germany

[73] Assignee: Friedrich Theysohn GmbH, Bad Oeynhausen, Fed. Rep. of Germany

[21] Appl. No.: 621,605

[22] Filed: Dec. 4, 1990

[51] Int. Cl.$^5$ .................. B29C 41/24; B29C 47/90
[52] U.S. Cl. ................. 425/190; 264/177.17; 264/177.19; 264/209.4; 425/192 R; 425/325; 425/377; 425/378.1; 425/461
[58] Field of Search .......... 425/190, 192 R, 325, 425/377, 378.1, 461, 467, 141; 264/177.17, 177.19, 209.4

[56] References Cited

U.S. PATENT DOCUMENTS

| | | | |
|---|---|---|---|
| 2,587,930 | 3/1952 | Uschmann | 425/461 |
| 3,378,887 | 4/1968 | Reib et al. | 425/388 |
| 4,100,243 | 7/1978 | Wissinger et al. | 264/209.4 |
| 4,120,926 | 10/1978 | Titz | 264/209.4 |
| 4,685,879 | 8/1987 | Pürstinger et al. | 425/461 |
| 4,874,306 | 10/1989 | Gearhart | 425/192 R |
| 4,913,863 | 4/1990 | Burrafato et al. | 264/177.17 |

FOREIGN PATENT DOCUMENTS

| | | |
|---|---|---|
| 0086623 | 8/1983 | European Pat. Off. |
| 0207064 | 12/1986 | European Pat. Off. |
| 0425942 | 5/1991 | European Pat. Off. |
| 1184941 | 1/1965 | Fed. Rep. of Germany |
| 2236363 | 2/1974 | Fed. Rep. of Germany |
| 2412818 | 9/1975 | Fed. Rep. of Germany |
| 3121697 | 12/1982 | Fed. Rep. of Germany |
| 63-162216 | 7/1988 | Japan .................. 264/177.17 |
| 357446 | 9/1931 | United Kingdom |

*Primary Examiner*—Tim Heitbrink
*Attorney, Agent, or Firm*—Marmorek, Guttman & Rubenstein

[57] ABSTRACT

A calibrating unit for an extruder includes an inner calibrating member, and a plurality of outer calibrating members at least partially surrounding the inner calibrating member and forming a gap therebetween through which a plastic material may be extruded, the plurality of outer calibrating members including a base member and at least a first lateral member. The calibrating unit also includes an integrated joint connecting the first lateral member to the base member. The first integrated joint includes a circular cylindrical hinge pin integrally formed along a longitudinal edge of the first lateral member, and a cylindrical circular bearing shell formed in the base member. The circular cylindrical hinge pin is received within the circular cylindrical bearing shell of the base member so that the first lateral member is rotatably interconnected to the base member.

8 Claims, 1 Drawing Sheet

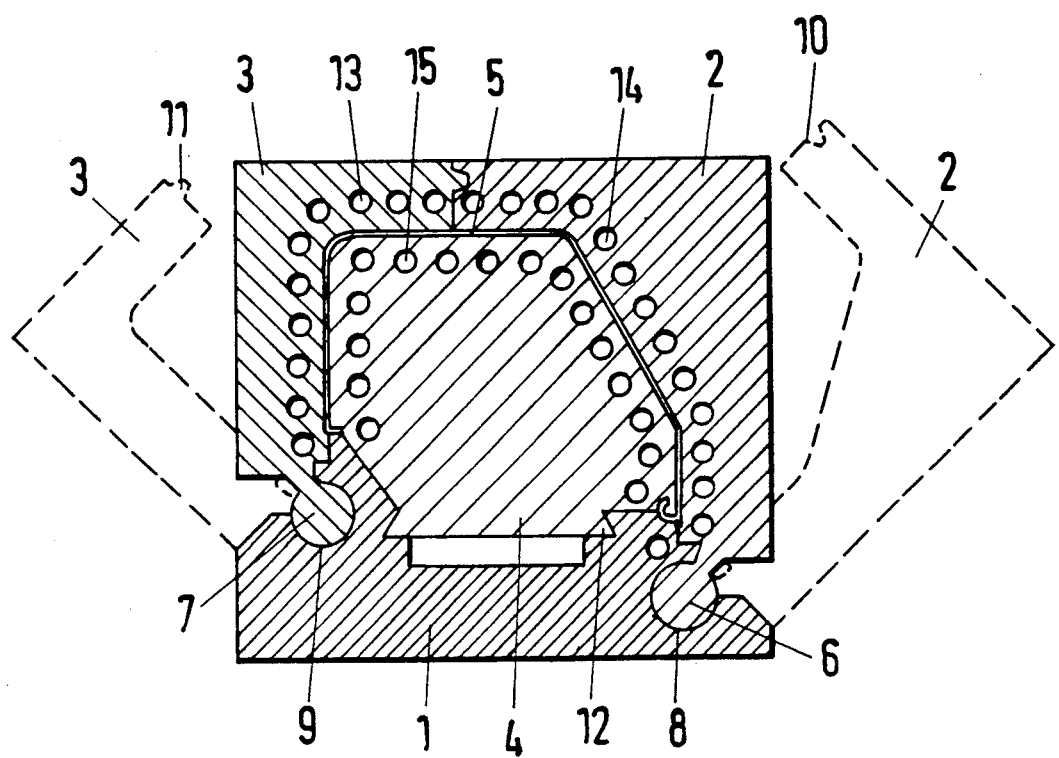

CALIBRATION UNIT FOR EXTRUDED PLASTIC MATERIAL

BACKGROUND OF THE INVENTION

The invention relates to a calibrating unit of an extruder for sections, which is made up of releasably interconnected inner and outer calibrating members.

In a known calibrated unit of the kind specified the individually produced calibrating members are held together by screwed connections or other connecting members. One important disadvantage of such a calibrating unit is that constantly increasing demands call for considerable expense to position the individual members with dimensional accuracy. Neither can this expense be substantially reduced by the fact that many members are interconnected via hinges, since the hinges must also be accurately positioned during assembly. There is also the aspect that such hinges ar fairly expensive to manufacture and assemble; moreover, the point of hinging is unfavourably placed, due to the construction.

It is an object of the invention to provide a calibrating unit of an extruder for sections whose members can be positioned with high dimensional accuracy in a problem-free manner.

SUMMARY OF THE INVENTION

This problem is solved according to the invention by the feature that of the outer calibrating members at least two members are interconnected via an integrated joint. Each integrated joint extends over the whole axial length of the calibrating unit.

According to one feature of the invention the or each inner calibrating member is releasably interconnected via an axial connecting link guide At its end remote from the or each joint, the or each outer calibrating member which can be hinged open can be locked after the fashion of a connecting link guide to other calibrating members.

A very effective feature of the invention is that the calibrating members are produced in a single operation by wire erosion from a workpiece annealed tension-free.

A particular advantage of the invention is that during the starting and stopping or during malfunctions of an extrusion line, the calibrating unit can be very simply and quickly opened and closed. The integrated joints ensure high dimensional accuracy, without the need to employ special care and time to obtain high dimensional accuracy on closure. The calibrating unit according to the invention is therefore suitable for automated operation.

BRIEF DESCRIPTION OF THE DRAWING

The invention will now be explained in greater detail with reference to an embodiment thereof shown in cross-section in the drawing.

DETAILED DESCRIPTION OF PREFERRED EMBODIMENT

Referring to the drawing, a calibrating unit consists of three outer members 1–3 and an inner member 4 which are fixed in position in relation to one another when the calibrating unit is closed. They form between themselves a cavity 5 of the section to be extruded.

The outer members 1–3 consist of a base 1 and two lateral members 2, 3 which are pivotably retained thereon and can be hinged open from the position shown in solid lines into the position shown in chain lines. The pivotable connection of each of these lateral members 2, 3 consists of a circular cylindrical hinge pin 6, 7 formed on a longitudinal edge of each lateral member 2, 3, and a circular cylindrical bearing shell 8, 9 formed in the base 1. The other longitudinal edge of the lateral members 2, 3 has a guide 10, 11 after the fashion of a connecting link guide which locks the two lateral members 2, 3 to one another when the calibrating unit is closed.

The inner member 4 of the calibrating unit is fixed on the base 1 via a dovetail guide 12 in the plane normal in relation to the axial plane. In the axial direction both the inner member 4 and the lateral members 2, 3 are locked in relation to the base 1 by means which are not shown.

Both the inner member 4 and the lateral members 2, 3 are formed with vacuum and/or cooling chanels 13–15 axially adjacent the cavity 5.

To produce a low-tolerance calibrating unit which is made up by various members and has integrated joints, the individual members are produced by wire erosion from a steel ingot annealed tension-free. Appropriate contouring control systems are required for producing the circular cross-sections of the joints.

I claim:

1. A calibrating unit for an extruder, comprising
an inner calibrating member,
a plurality of outer calibrating members at least partially surrounding said inner calibrating member and forming a gap extending along an axial direction between said outer calibrating members and said inner calibrating member through which a plastic material can be extruded,
said plurality of outer calibrating members being releasably interconnected to each other,
said plurality of outer calibrating members including a base member and at least a first lateral member,
and a first integrated joint connecting said first lateral member to said base member, said first integrated joint comprising a first part formed integrally with said first lateral member and a second part formed integrally with said base member, said first and second parts cooperating to rotatably interconnect said first lateral member and said base member,
wherein said first part of said first integrated joint comprises a circular cylindrical hinge pin extending from an edge of said first lateral member, and said second part of said first integrated joint comprises a circular cylindrical bearing shell formed in said base member, said hinge pin being received within said bearing shell.

2. The calibrating unit of claim 1 wherein said first integrated joint extends along the entire axial length of said calibrating unit.

3. The calibrating unit of any of claims 1 or 2 further comprising a first axial connecting link guide releasably connecting said inner calibrating member to at least one of said outer calibrating members.

4. The calibrating unit of claim 3 wherein said first connecting link guide releasably connects said inner calibrating member to said base member.

5. The calibrating unit of any one of claims 1 or 2 further comprising a second lateral member and a second integrated joint connecting said second lateral member to said base member, said second integrated joint comprising a circular cylindrical hinge pin extending from an edge of said second lateral member and a second circular cylindrical bearing shell formed in said base member, said hinge pin of said second lateral member being received within said second bearing shell to rotatably interconnect said second lateral member and said base member.

6. The calibrating unit of claim 5 wherein said integrated joint extends along the entire axial length of said calibrating unit.

7. The calibrating unit of claim 5 further comprising a second axial connecting link guide releasably connecting said first and second lateral members.

8. The calibrating unit of claim 6 wherein said inner calibrating member and said plurality of outer calibrating members are formed from a wire eroded, tension-free annealed workpiece.

* * * * *